United States Patent
Varfolomeeva et al.

(10) Patent No.: US 10,837,839 B2
(45) Date of Patent: Nov. 17, 2020

(54) METHOD FOR MANUFACTURING A TEMPERATURE SENSOR

(71) Applicant: Innovative Sensor Technology IST AG, Ebnat-Kappel (CH)

(72) Inventors: Julia Varfolomeeva, Zürich (CH); Florian Krogmann, Kreuzlingen (CH)

(73) Assignee: Innovative Sensor Technology IST AG, Ebnat-Kappel (CH)

( * ) Notice: Subject to any disclaimer, the term of this patent is extended or adjusted under 35 U.S.C. 154(b) by 193 days.

(21) Appl. No.: 15/755,209

(22) PCT Filed: Aug. 12, 2016

(86) PCT No.: PCT/EP2016/069192
§ 371 (c)(1),
(2) Date: Feb. 26, 2018

(87) PCT Pub. No.: WO2017/036760
PCT Pub. Date: Mar. 9, 2017

(65) Prior Publication Data
US 2018/0252591 A1    Sep. 6, 2018

(30) Foreign Application Priority Data
Aug. 28, 2015    (DE) .................. 10 2015 114 314

(51) Int. Cl.
*G01K 1/14*    (2006.01)
*G01K 1/16*    (2006.01)
(Continued)

(52) U.S. Cl.
CPC .................. *G01K 1/14* (2013.01); *B22F 3/10* (2013.01); *G01K 1/16* (2013.01); *G01K 7/16* (2013.01); *G01K 7/22* (2013.01)

(58) Field of Classification Search
CPC .. G01K 1/14; G01K 7/16; G01K 1/16; G01K 7/22; B22F 3/10
See application file for complete search history.

(56) References Cited

U.S. PATENT DOCUMENTS

| 3,936,789 A | * | 2/1976 | Matzen | ................ H01C 17/232 338/22 SD |
| 2004/0169249 A1 | * | 9/2004 | Parsons | .................... G01K 7/16 257/468 |

(Continued)

FOREIGN PATENT DOCUMENTS

| DE | 102009026439 A1 | 12/2010 |
| DE | 102010050315 A1 | 5/2012 |

(Continued)

OTHER PUBLICATIONS

Search Report for German Patent Application No. 10 2015 114 314.3, German Patent Office, dated Jun. 6, 2016, 8 pp.
(Continued)

*Primary Examiner* — Brandi N Hopkins
*Assistant Examiner* — Janice M Soto
(74) *Attorney, Agent, or Firm* — Christopher R. Powers; Endress+Hauser (USA) Holding Inc.

(57) ABSTRACT

A method for manufacturing a temperature sensor, which includes at least one temperature sensor element with an at least partially metallized face and a support, includes applying a connecting layer of at least gold, silver and/or palladium to the support, applying a silver sinter paste layer, arranging the temperature sensor element on the support, so that the temperature sensor element with the at least partially metallized face contacts the support via the connecting layer and the silver paste layer, and sintering of the silver sinter paste layer for connecting the temperature sensor element with the support.

15 Claims, 4 Drawing Sheets

(51) Int. Cl.
    *G01K 7/16*     (2006.01)
    *B22F 3/10*     (2006.01)
    *G01K 7/22*     (2006.01)

(56) References Cited

U.S. PATENT DOCUMENTS

| | | | | |
|---|---|---|---|---|
| 2010/0279139 | A1* | 11/2010 | Iwahashi | B22F 7/08 |
| | | | | 428/553 |
| 2013/0228890 | A1* | 9/2013 | Eisele | G01K 7/16 |
| | | | | 257/467 |
| 2016/0103020 | A1* | 4/2016 | Liehr | B23K 1/0008 |
| | | | | 374/183 |
| 2017/0162303 | A1* | 6/2017 | Strallhofer | H01C 1/1413 |
| 2017/0219440 | A1* | 8/2017 | Strallhofer | G01K 1/12 |

FOREIGN PATENT DOCUMENTS

| | | | |
|---|---|---|---|
| DE | 102013208785 | A1 | 11/2014 |
| DE | 102014110553 | A1 | 1/2016 |
| EP | 0242626 | A2 | 10/1987 |
| EP | 2042260 | A2 | 4/2009 |
| JP | 58158980 | A | 9/1983 |

OTHER PUBLICATIONS

Search Report for International Patent Application No. PCT/EP2016/069192, WIPO, dated Sep. 27, 2016, 12 pp.

* cited by examiner

METHOD FOR MANUFACTURING A TEMPERATURE SENSOR

CROSS-REFERENCE TO RELATED APPLICATIONS

The present application is related to and claims the priority benefit of German Patent Application No. 10 2015 114 314.3, filed on Aug. 28, 2015, and International Patent Application No. PCT/EP2016/069192, filed on Aug. 12, 2016, the entire contents of which are incorporated herein by reference.

TECHNICAL FIELD

The invention relates to a method for manufacturing a temperature sensor, as well as to a temperature sensor for use at high temperatures, preferably at temperatures above about, for instance, 200° C.

BACKGROUND

Known from the state of the art are numerous temperature sensor elements for determining a temperature. These are manufactured, for example, in thin film technology and have on a substrate a functional layer of, for example, platinum. By means of this functional layer, a temperature of a medium, with which the functional layer is in thermal interaction, can be determined.

For use, such temperature sensor elements are placed in a housing for protection against external influences (mechanical, chemical, etc.). This leads, however, to an influencing of the thermal interaction between temperature sensor element and medium, so that a delayed, or deteriorated, response time arises.

In order to improve the response time of such a temperature sensor element, a common approach is to solder the temperature sensor element to a floor of the housing, in order to achieve an improved thermal interaction. Used for this are conventional soldering techniques, which bring their own difficulties as regards the melting temperature. Thus, in the last years, there is a trend toward use of leadfree solders. Leadfree solders, especially leadfree low temperature solders, have typically a melting temperature below 220° C. Relatively low melting temperature also limit use temperature of the temperature sensor to a range up to about 200° C.

Alternatively, there are leadfree solders with a melting temperature of above 900° C. These are typically silver based. Disadvantageous with these solders is that a high temperature is required, in order to use them, so that a temperature sensor element to be soldered therewith must likewise withstand such temperatures.

Currently, no joining technology is known, which enables a reliable and thermally well-coupled installation of a temperature sensor element in a housing, such that use also at high temperatures, especially at temperatures in the range of about 200-900° C., is possible.

Along with that, conventional soldering techniques often have the problem of solder lacking regions in the joint, i.e. voids and/or air and flux inclusions to an undesirably high fraction. The solder lacking regions in the joint lead, in turn, to the fact that the thermal interaction between medium and temperature sensor element is degraded.

SUMMARY

An object of the invention is, thus, to overcome the above described disadvantages of the state of the art.

The object of the invention is achieved by a method for manufacturing a temperature sensor, a temperature sensor for use at high temperatures and use of the temperature sensor in a flow measuring apparatus.

As regards the method, the object is achieved by a method for manufacturing a temperature sensor, wherein the temperature sensor includes at least one temperature sensor element with an at least partially metallized face and a support, wherein the method comprises steps as follows:
  applying a connecting layer of at least gold, silver and/or palladium to the support;
  applying a silver sinter paste layer;
  arranging the temperature sensor element on the support, so that the temperature sensor element with the at least partially metallized face contacts the support via the connecting layer and the silver paste layer;
  sintering the silver sinter paste layer for connecting the temperature sensor element with the support.

According to the invention, silver sintering is provided for affixing the temperature sensor element on a support. The support comprises preferably stainless steel, copper and/or nickel.

The connecting layer is advantageously applied by thin film technology, so that the thickness of the connecting layer lies typically in the range from several hundred nanometers up to a few micrometers. Proved as especially advantageous in such case is a sputtering process for deposition. Depending on the material of the support and geometry, however, also a galvanic deposition can be advantageous.

The silver sinter paste applied for the silver sintering contains extremely fine silver particles, which coalesce to solid silver already at sinter temperatures from about 230° C. to 300° C. The occurring silver sinter layer has the usual properties known for silver, especially a melting point of 961° C. Thus, a temperature sensor manufactured in such a manner can be applied also at temperatures above 200° C.

Advantageous in the case of the silver sintering is likewise that no flux is required and, thus, solder lacking regions in the joint essentially can be prevented.

An advantageous form of embodiment of the method of the invention provides that the silver sinter paste layer is applied on the connecting layer of the support.

An alternative form of embodiment of the method of the invention provides that instead of the applying the silver sinter layer on the connecting layer such is applied on the at least partially metallized face of the temperature sensor element.

Another advantageous form of embodiment of the method of the invention provides that the support, for example, a thin platelet, after the arranging of the temperature sensor element and the sintering of the silver sinter paste layer, is connected with a housing, for example, a hollow cylindrical housing, by material bonding.

An alternative form of embodiment of the method of the invention provides that, instead of, for example, a thin platelet, the support is a housing wall, preferably a floor, of a housing.

Another advantageous form of embodiment of the method of the invention provides that a temperature profile with at least one rising temperature ramp is used for sintering the silver sinter paste layer.

Another advantageous form of embodiment of the method of the invention provides that the at least partially metallized face comprises at least gold, silver and/or palladium.

Another advantageous form of embodiment of the method of the invention provides that the at least partially metallized face is produced via a thin-film process.

Another advantageous form of embodiment of the method of the invention provides that during the sintering of the silver sinter paste layer a defined pressure is applied on the temperature sensor element, so that a defined coating thickness of the silver sinter paste layer arises. By a defined, thin, coating thickness, which typically is a few micrometers to a maximum of several tens of micrometers thick, the solvent in the silver sinter paste layer can better escape.

As regards the temperature sensor, the object is achieved by a temperature sensor for use at high temperatures, preferably at temperatures above about, for instance, 200° C., comprising a housing, in which at least one temperature sensor element is arranged, wherein the temperature sensor element has at least one partially metallized face and is connected with a silver sinter layer via the at least partially metallized face, wherein the silver sinter layer is connected with a housing wall of the housing either via a connecting layer, which comprises at least gold, silver and/or palladium, or directly with the housing via a housing wall, which comprises at least gold, silver and/or palladium.

An advantageous embodiment of the temperature sensor of the invention provides that the temperature sensor element includes a functional layer for determining a temperature. Especially, the embodiment provides that at least two contact wires are provided for contacting the functional layer with an electronics unit, wherein the contact wires via wire end regions are arranged in such a manner on the functional layer that the wire end regions are directed away from the housing wall of the housing.

Furthermore, the embodiment provides especially that the at least partially metallized face is a face of the temperature sensor element lying opposite the functional layer or a side wall of the temperature sensor element arranged essentially orthogonally to the functional layer.

Another advantageous embodiment of the temperature sensor of the invention provides that the temperature sensor element is supplied at least via the housing wall of the housing and the silver sinter layer with the temperature to be determined.

As regards use, the object is achieved by use of a temperature sensor according to at least one of the above described embodiments as a heating element, especially as a heating element in a flow measuring apparatus.

BRIEF DESCRIPTION OF THE DRAWINGS

The invention will now be explained in greater detail based on the appended drawing figures as follows.

DETAILED DESCRIPTION

Figure 1:
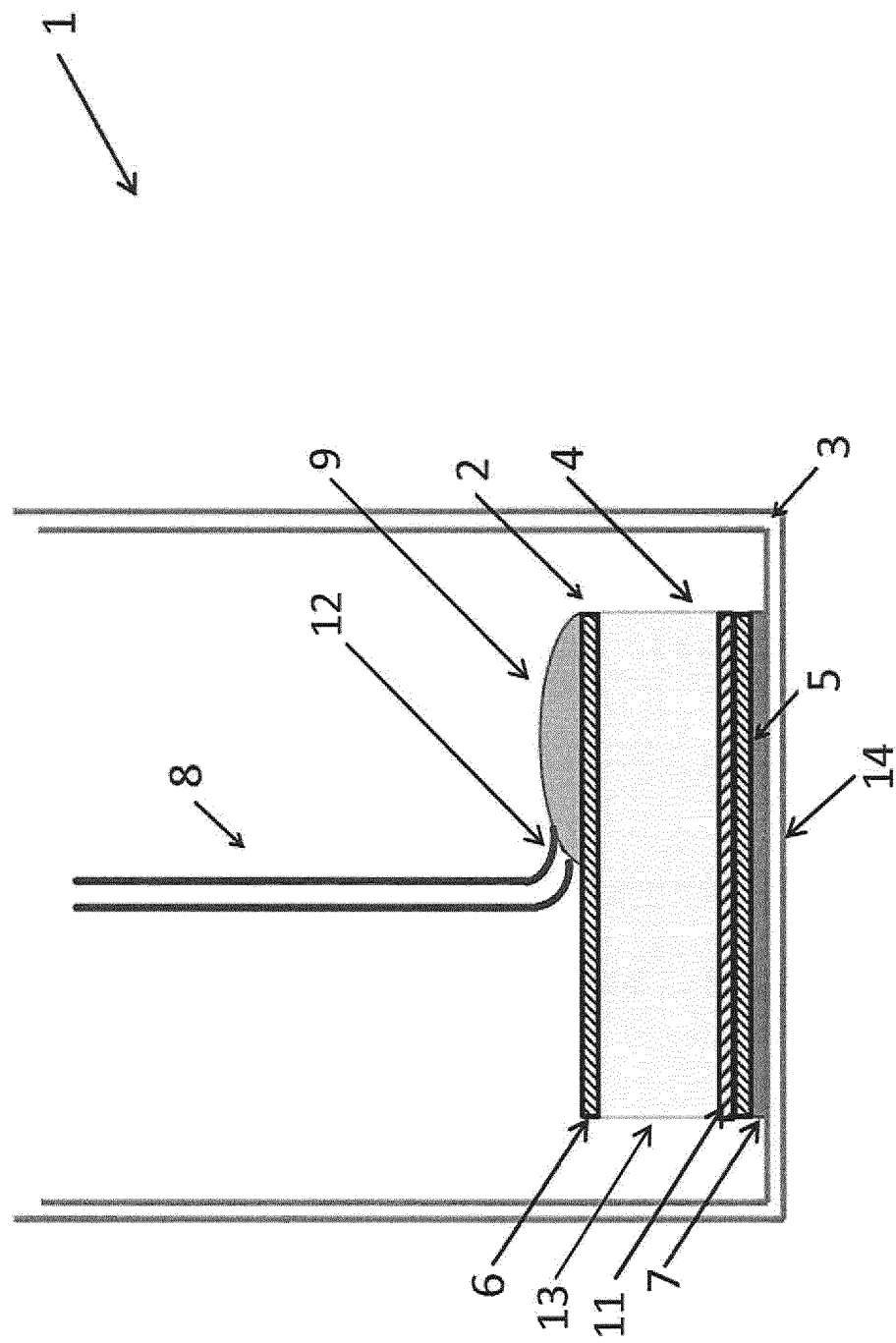
FIG. 1 shows a first example of an embodiment of the temperature sensor of the invention with a first arrangement as regards the contact wires.

FIG. 1 shows a first example of an embodiment of the temperature sensor of the invention. The temperature sensor 1 includes, in such case, a temperature sensor element 2 and a housing 3. The housing 3 shown in FIG. 1 is typically a small tube closed on its lower end, preferably a small tube made of metal.

The temperature sensor element 2 includes a substrate 4, for example, a ceramic substrate, a functional layer 6 for determining a temperature, for example, a platinum meander structure with a defined temperature dependent resistance, and a metallized face 11.

The functional layer 6 is connected via contact wires 8 with a corresponding electronics unit (not shown in FIG. 1), which performs the conversion of the resistance value into a temperature value. For this, according to the first example of an embodiment illustrated in FIG. 1, the contact wires 8 are arranged via their wire end regions 12 in such a manner on the functional layer 6, or a provided contact area, that the wire end regions 12 are directed away from the housing wall of the housing 3, so that these do not come in contact with the housing wall.

The contact wires 8 of the first variant illustrated in FIG. 1 show relative to the first example of an embodiment for contacting the temperature sensor of the invention by means of contact wires that the wire end regions 12 first extend essentially parallel to a substrate surface and then the wire continuations extend essentially parallel to a central axis, which is orthogonal to the substrate surface. In this example of an embodiment, the metallized face 11 is arranged on the face of the temperature sensor element 2 lying opposite the functional layer 6.

Figures 2A, 2B:
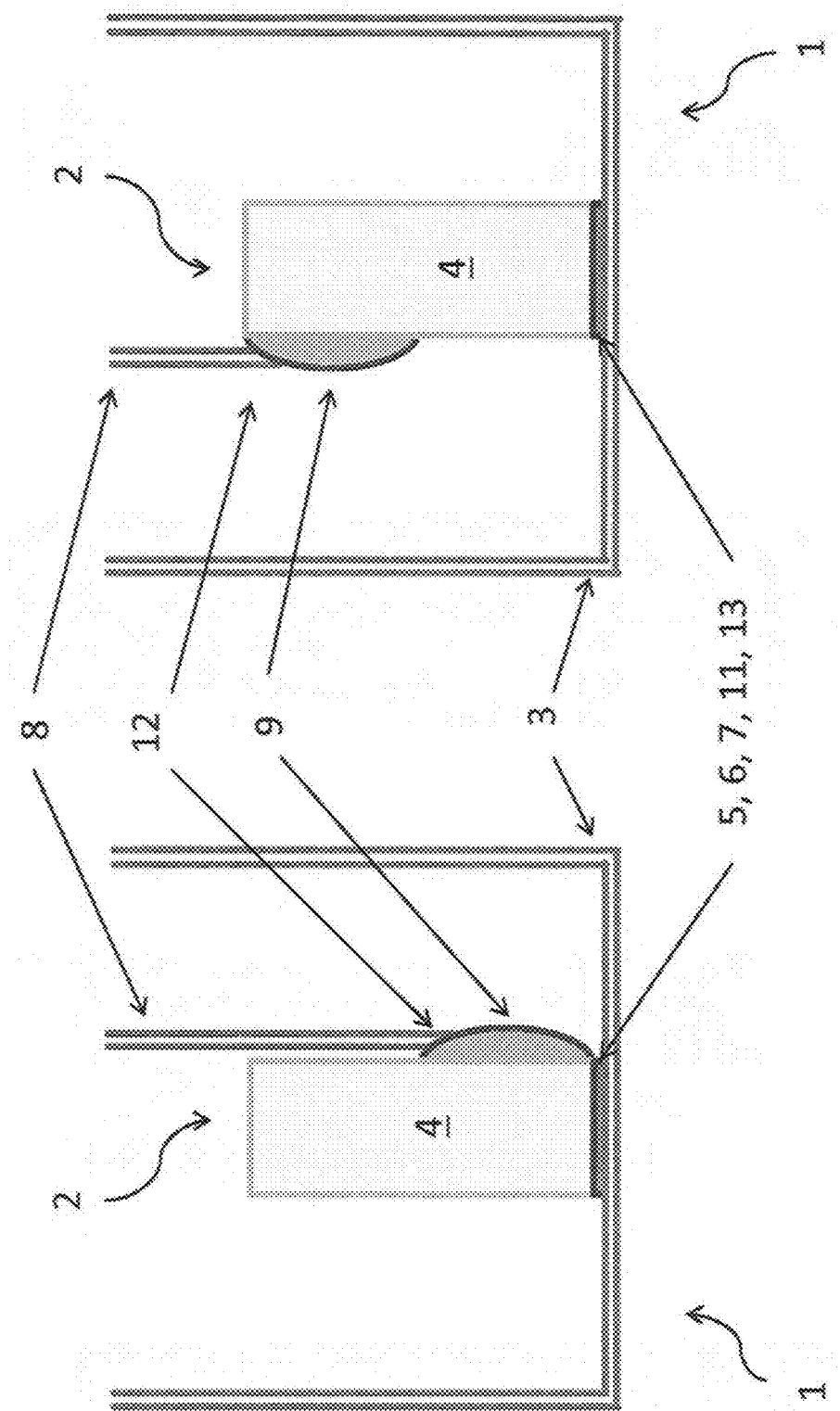
FIGS. 2A and 2B show variants of a second example of an embodiment of the temperature sensor of the invention with two additional arrangements as regards the contact wires.

The metallized face 11 as shown in FIG. 1 is typically arranged on the face of the temperature sensor element 2 lying opposite the functional layer 6. Other options include, however, also an embodiment, in the case of which a side wall 13 of the temperature sensor element 2 serves at least partially as metallized face 11 (compare. FIG. 2).

The housing 3 shown in FIG. 1 is one piece. For example, here a small tube closed on at least one end serves as housing 3. The temperature sensor element 2 is in the case of this variant connected via a silver sinter layer 5 with a floor 14 of the small tube, which serves as support.

FIG. 2 shows two alternative variants (a) and (b) relative to the contacting of the temperature sensor of the invention by means of the contact wires. These variants show that both the wire end regions as well as also the wire continuations extend essentially parallel to the faces of the substrate. The wires thus have no bends or the like. These variants reduce the danger of an unintentional touching of the contact wires is against a housing wall.

Furthermore, the variants illustrated in FIG. 2 differ compared with the embodiment illustrated in FIG. 1 in that a side wall 13 of the temperature sensor element 2 serves at least partially as metallized face 11. Thus, the temperature sensor element is arranged virtually upright in the housing. These variants offer, thus, the advantage that the temperature sensor element can also be introduced into a very small housing, for example, a small tube with a diameter of only a few millimeters.

Figure 3:
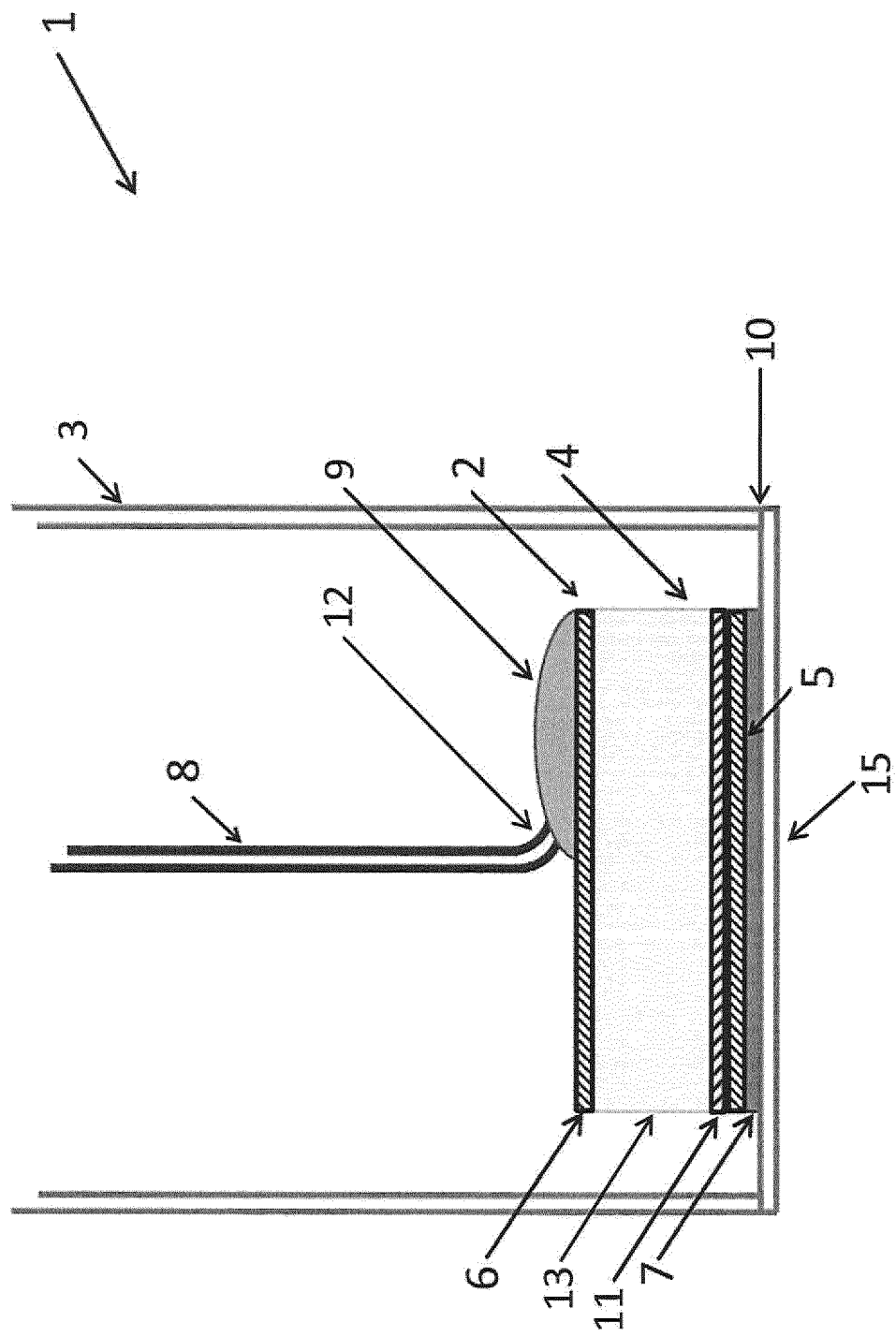
FIG. 3 shows a third example of an embodiment of the temperature sensor of the invention.

FIG. 3 shows a schematic representation of an alternative embodiment of the temperature sensor 1 of the invention, in the case of which the housing 3 is constructed of two parts. In such case, the construction of the temperature sensor element 2 is essentially as above described.

Only the housing 3 differs such that there serves as floor of the housing, in this case the small tube, a support, for example, a platelet 15, which, after the temperature sensor element 2 has been affixed on the platelet 15, is connected with the housing wall, here the wall of the small tube. Typically, this connection is produced by material bonding, for example, by welding. The joint is indicated in FIG. 3 with the reference character 10. This procedure offers the advantage that a simplified arranging, or placing, of the temperature sensor element 2 on the platelet 15 is possible as compared with the floor of the small tube.

Furthermore, both the embodiment of the temperature sensor 1 shown in FIG. 1 with a one-piece housing 3 as well as also the embodiment shown in FIG. 3 with a two-part housing 3, 15 include a connecting layer 7. Connecting layer 7 contains gold, silver to and/or platinum. In the case of a one-piece housing 3, the connecting layer 7 is applied on a floor 14 of the housing, which serves as support, and in the case of a housing 3, 15 composed of two parts, the connecting layer is applied, for example, to a platelet 15, which serves as support. Platelet 15 is then connected in a later method step with a housing 3, which, initially, has no housing floor.

Connecting layer 7 serves for adhesion promotion between substrate 4 and the support, on which the substrate 4 is applied during the manufacturing process.

Figure 4:
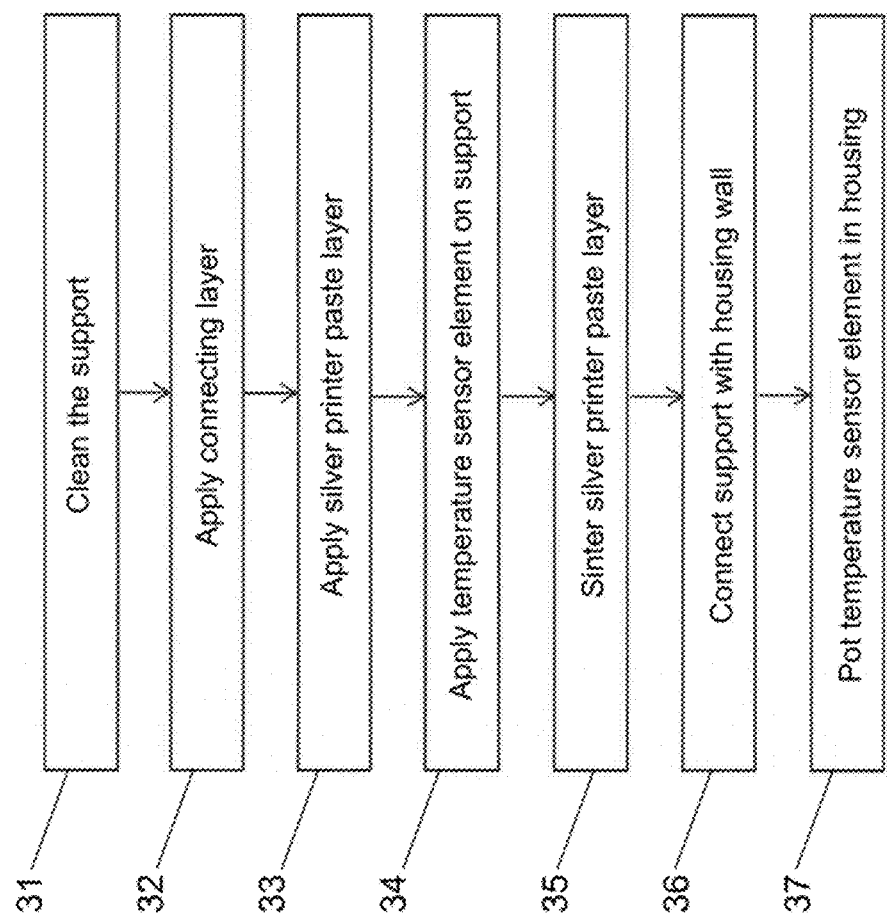
FIG. 4 shows a schematic flow diagram of the method of the invention.

FIG. 4 shows a schematic flow diagram with the individual method steps of the method of the invention. The method of the invention includes, in such case, steps as follows:

In step 31, a cleaning of the support 14 or 15, on which the temperature sensor element 2 is to be affixed, is performed. Preferably, this cleaning is performed by means of acetone and/or isopropanol. Found especially advantageous has been wet chemical cleaning with following ion etching and/or plasma cleaning.

In step 32, a gold, silver or palladium layer is applied on the support 14 or 15 as connecting layer 7.

Then, in step 33, a silver sinter paste layer 5 is produced by means of a silver sinter paste. The applying of the silver sinter paste can, in such case, occur both on the support 14 or 15 as well as also on the metallized face 11 of the substrate 4 of the temperature sensor element 2. Found to be advantageous, especially in the case, in which the floor of the one-piece housing, for example, in the form of a small tube, is to serve as support, is when the silver sinter paste layer 5 is applied on the metallized face 11 of the substrate 4.

In step 34, then the temperature sensor element, or the temperature sensor, is applied, or arranged, on the support. This occurs preferably with application of a defined pressure, so that a defined coating thickness of the silver conducting layer arises.

In the following step 35, the sintering of the silver sinter paste layer 5 occurs by heating the temperature sensor 1 in a furnace. Especially advantageously, this is done using at least two rising temperature ramps. In such case, the furnace is heated with the first temperature ramp at, for example, 10° C. per minute, from room temperature to a first temperature. Then, the furnace is kept for a first time span at the first temperature, so that solvent in the silver sinter paste layer can evaporate. Then, the furnace is heated to a second temperature. For this, advantageously, a second temperature ramp is used, which has, for example, a slope of 50° C. per minute. The actual sintering of the silver sinter paste layer occurs at the second temperature. After holding in the furnace for a defined time span at the second temperature, then a cooling by means of a falling temperature ramp occurs.

In the additional step 36, which is only performed in the case that the housing 3 is constructed of two parts, a connection, preferably a material bonded connection, of the platelet 15 as support with the housing wall 36 is produced.

In a last step 37, which is performed only when required, the temperature sensor element 2 is potted in the housing 3. Suited for this are both ceramic—as well as also polymer pottings.

The invention claimed is:

1. A method for manufacturing a temperature sensor, comprising:
applying a connecting layer to a support of the temperature sensor, the temperature sensor further including a temperature sensor element with an at least partially metallized face;
applying a silver sinter paste layer;
arranging the temperature sensor element on the support such that the temperature sensor element with the at least partially metallized face contacts the support via the connecting layer and the silver sinter paste layer; and
sintering the silver sinter paste layer at a temperature greater than 200° C. to connect the temperature sensor element with the support such that the temperature sensor and the connection between the temperature sensor element and the support are operable at temperatures greater than 200° C.,
wherein the support is a housing wall or a floor of a housing within which the temperature sensor element is disposed.

2. The method of claim 1, wherein the applied connecting layer includes gold, silver and/or palladium.

3. The method of claim 1, wherein the silver sinter paste layer is applied on the connecting layer applied to the support.

4. The method of claim 1, wherein the silver sinter paste layer is applied on the at least partially metallized face of the temperature sensor element.

5. The method of claim 1, wherein the support, after the arranging of the temperature sensor element and the sintering of the silver sinter paste layer, is connected with a housing by material bonding.

6. The method of claim 1, wherein the sintering of the silver sinter paste layer includes a temperature profile with at least one rising temperature ramp.

7. The method of claim 1, wherein the at least partially metallized face includes gold, silver and/or palladium.

8. The method of claim 1, the method further comprising at least partially metallizing a face of the temperature sensor element via a thin-film process to produce the at least partially metallized face.

9. The method of claim 1, wherein during the sintering of the silver sinter paste layer a pre-determined pressure is applied on the temperature sensor element such that a desired coating thickness of the silver sinter paste layer results.

10. A high temperature sensor, comprising:
a housing;
a temperature sensor element disposed within the housing and including at least one, at least partially metallized face, the temperature sensor configured to determine a target temperature; and
a silver sinter layer affixed to the temperature sensor element via the at least one, at least partially metallized face and to a wall of the housing at a sinter temperature greater than 200° C., either directly to the wall or via a connecting layer that is affixed to the wall, wherein the connecting layer includes gold, silver and/or palladium and/or the wall includes gold, silver and/or palladium, wherein the silver sinter layer is adapted such that the temperature sensor and the silver sinter layer are operable at target temperatures greater than 200° C., and wherein the temperature sensor element is affixed to the wall of the housing such that the temperature sensor element is exposed to the target temperature to be determined at least via the wall and the silver sinter layer.

11. The high temperature sensor of claim 10, wherein the temperature sensor element includes a functional layer configured to determine the target temperature.

12. The high temperature sensor of claim 11, further comprising:
at least two contact wires each having a wire end portion and embodied for connecting the functional layer with an electronics unit, wherein the at least two contact wires are in electrical communication with the functional layer and oriented such that the wire end portions are directed away from any housing wall of the housing.

13. The high temperature sensor of claim 11, wherein the at least partially metallized face is a face of the temperature sensor element lying opposite the functional layer or is a side wall of the temperature sensor element arranged substantially orthogonally to the functional layer.

14. The high temperature sensor of claim 11, wherein the temperature sensor is configured as a heating element of a flow measuring apparatus.

15. The high temperature sensor of claim 11, wherein the temperature sensor is capable of determining temperatures above 200° C.

* * * * *